Patented Sept. 28, 1948

2,450,028

UNITED STATES PATENT OFFICE 2,450,028

DIMETHYL STYRENE POLYMERIZATION PRODUCTS AND THEIR PREPARATION

Karl H. Weber, Lancaster, and Paul O. Powers, Manheim Township, Lancaster County, Pa., assignors to Armstrong Cork Company, Lancaster, Pa., a corporation of Pennsylvania No Drawing. Application October 12, 1942, Serial No. 461,782

3 Claims. (Cl. 260—86.5)

This invention relates to the production of synthetic materials by copolymerizing an open chain aliphatic conjugated diene with para-methyl-alpha-methylstyrene.

We have discovered that para-methyl-alpha-methylstyrene may be copolymerized with an open chain aliphatic conjugated diene, such as butadiene, isoprene, butadiene and isoprene, butadiene and piperylene, and the like, all as more fully hereinafter set forth, to produce materials having desirable properties and in many instances and respects exhibiting characteristics more similar to natural rubber than previously known rubber-like materials. By copolymerizing butadiene with para-methyl-alpha-methylstyrene, a rubber-like material may be produced which, when compounded and cured, has a tensile strength equal to or greater than natural rubber similarly compounded and cured. Other novel features will become more apparent from the following description.

The para-methyl-alpha-methylstyrene and the conjugated diene or dienes preferably are co-polymerized in an aqueous emulsion which is formed with the aid of an emulsifying agent, which may be a salt of aliphatic or alicyclic acids containing at least twelve and not more than twenty-four carbon atoms, or mixtures thereof, and an ethanolamine as is set forth more fully in the copending patent application, Serial No. 461,781, filed October 12, 1942, now abandoned, by Karl H. Weber, one of the present applicants. The emulsion also preferably includes a polymerization catalyst and may include a polymerization regulator. Upon polymerization, a latex-like emulsion containing the copolymer is formed and this latex-like emulsion is similar in many respects to natural rubber latex and may be precipitated or coagulated, treated and compounded in a manner similar to natural rubber.

The following examples in which the parts are given by weight serve to illustrate this invention, it being understood that it is not limited to the exact proportions or conditions set forth.

Example I

An aqueous polymerizing emulsion was formed comprising:

| | Parts |
|---|---|
| Butadiene | 130 |
| Para-methyl-alpha-methylstyrene | 70 |
| Water | 300 |
| 2-amino-2-methyl-1-propanol oleate (emulsifying agent) | 10 |
| Ammonium persulphate (polymerization catalyst) | 0.4 |

The reactive materials were copolymerized by agitating the emulsion for 288 hours at a temperature of 25° C. and an initial pressure of 36 pounds per square inch which gradually dropped to less than ten pounds as polymerization proceeded. The latex-like emulsion was coagulated by pouring it into about a 5% acetic acid solution. The precipitated, rubber-like material was somewhat similar to natural crepe and was washed, dried, and broken down or masticated for about ten minutes by milling between closely set steel rolls. About 2% of an anti-oxidant, phenyl-beta-naphthylamine, was milled into the raw material at this time. The rubber-like material had good tackiness and it was not necessary to add any softening or plasticizing agent before milling, whereas, the usual butadiene synthetic rubbers, such as the butadiene-styrene types, are difficult to mill without the addition of softeners and/or plasticizers. Our raw, rubber-like material is quite similar to raw natural rubber in its compounding and working properties.

A typical tire tread stock was compounded from the above rubber-like material, here referred to as "synthetic crepe," according to the following formula:

| | Parts |
|---|---|
| Synthetic crepe | 100 |
| Channel black | 40 |
| Zinc oxide | 5 |
| Stearic acid | 2 |
| Sulphur | 2.25 |
| "Santocure" | 1.2 |

"Santocure" is a trade name for a curing accelerator comprising the reaction product of cyclohexylamine and mercaptobenzothiazole. After the synthetic crepe was broken down or masticated, the "Santocure" was added, followed by the sulphur. The stearic acid and zinc oxide were then simultaneously blended in and finally carbon black was milled into the synthetic crepe.

A tire tread stock compounded according to the above formula was cured for 95 minutes at a temperature of 258° F. A sample of this cured stock was allowed to stand for a number of hours and then tested by the standard ASTM method for strength and elongation. The tensile strength was found to be 6,075 pounds per square inch and the elongation 630%, at break. For purposes of comparison, a typical tire tread stock, compounded substantially as above using natural rubber, has a tensile strength of about 4,500 to 4,800 pounds per square inch, and an elongation of about 600% to 700%, at break.

Example II

An aqueous polymerizing emulsion was prepared according to the following formula:

| | Parts |
|---|---|
| Butadiene | 150 |
| Para-methyl-alpha-methylstyrene | 50 |
| Water | 300 |
| 2-amino-2-methyl-1-propanol oleate | 10 |
| Polymerization catalyst | 0.4 |

Polymerization was carried out by agitating the emulsion for 165 hours at a temperature of 25° C. and an initial pressure of 35 pounds per square inch. The latex-like emulsion of the copolymer was coagulated and the precipitated crepe was masticated and compounded as set forth under Example I to form a tire tread stock. The stock was cured for 20 minutes at 290° F. and the vulcanized stock had a tensile strength of 3,400 pounds per square inch and an elongation of 660%, at break.

Example III

A polymerization emulsion was prepared according to the following formula:

| | Parts |
|---|---|
| Butadiene | 170 |
| Para-methyl-alpha-methylstryene | 30 |
| Water | 300 |
| 2-amino-2-methyl-1-propanol oleate | 10 |
| Polymerization catalyst | 0.4 |

The emulsion was agitated for 165 hours at a temperature of 25° C. and at an initial pressure of 35 pounds per square inch. The latex-like emulsion was coagulated and the precipitated crepe compounded according to Example I to form a tire tread stock. The stock was cured at 290° F. for 20 minutes and was found to have a tensile strength of 3,080 pounds per square inch and an elongation of 380% at a break.

Example IV

An aqueous polymerizing emulsion was prepared according to the following formula:

| | Parts |
|---|---|
| Isoprene | 150 |
| Para-methyl-alpha-methylstyrene | 50 |
| Water | 300 |
| 2-amino-2-methyl-1-propanol oleate | 10 |
| Polymerization catalyst | 0.4 |

This emulsion was agitated for 288 hours at a temperature of 25° C. The resultant latex-like emulsion was coagulated and the precipitated rubber-like material compounded substantially according to Example I to form a tire tread stock. The stock was cured at 290° F. for 20 minutes and was found to have a tensile strength of 2,270 pounds per square inch and an elongation of 380% at break.

Example V

An aqueous polymerizing emulsion was prepared according to the following formula:

| | Parts |
|---|---|
| Isoprene | 25 |
| Butadiene | 165 |
| Para-methyl-alpha-methylstyrene | 65 |
| Water | 300 |
| 2-amino-2-methyl-1-propanol oleate | 10 |
| Polymerization catalyst | 0.4 |

This emulsion was agitated for 288 hours at a temperature of 25° C., and the precipitated rubber-like material was compounded to form a tire tread stock, substantially as described for Example I. The tire tread stock was cured at 290° F. for 20 minutes and was found to have a tensile strength of 3,120 pounds per square inch and an elongation of 300% at break.

Example VI

An aqueous polymerizing emulsion was prepared according to the following formula:

| | Parts |
|---|---|
| Butadiene | 130 |
| Para-methyl-alpha-methylstyrene | 70 |
| Water | 300 |
| 2-amino-2-methyl-1-propanol oleate | 10 |
| Ammonium persulphate | 0.4 |

The aqueous emulsion was agitated for about 48 hours at a temperature of about 50° C. and an initial pressure of about 58 to 60 pounds per square inch. The precipitated rubber-like material was compounded to form a tire tread stock substantially as described for Example I. The tire tread stock was cured at 258° F. for 95 minutes and was found to have a tensile strength of 3,850 pounds per square inch and an elongation of 430% at break.

The time required for polymerizing reactive materials is partially dependent on the temperature used. Increasing the temperature tends to shorten the time required for polymerization, but when the polymerization period is greatly shortened there is a tendency to produce rubber-like materials which when compounded have a relatively lower tensile strength.

The preferred range of reactants is between about 15 to 40 parts by weight of para methyl alpha methylstyrene and about 85 to 60 parts by weight of conjugated diene. It has been found that, in general, and as exemplified by the examples given above, an increase in the percentage of para-methyl-alpha-methylstyrene increases the tensile strength of the rubber-like material and this increase in tensile strength is especially noticeable after the rubber-like material has been compounded and vulcanized. But, it also has been found that when the para-methyl-alpha-methylstyrene is used in amounts greater than about 40% of the total, there is an excess of the para-methyl-alpha-methylstyrene in the latex-like emulsion which does not polymerize. Unlike styrene, para-methyl-alpha-methylstyrene, insofar as we have been able to determine, does not polymerize with itself, and the quantity of the para-methyl-alpha-methylstyrene which will readily copolymerize with the conjugated diene is limited to about the above ratio. Further, in each of the above examples there is a relatively small percentage of the open chain aliphatic conjugated diene which does not polymerize or which only forms a polymer of low molecular weight and these low polymers do not coagulate when the latex-like emulsion is acidified. The monomers and the low polymers of the diene and the unpolymerized para-methyl-alpha-methylstyrene are preferably removed by washing the raw rubber-like material to prevent these compounds from adversely affecting the rubber-like material. The qualities of the different polymerization products made according to our invention will vary with the particular materials used, the proportioning and conditions under which polymerization is effected. A wide variety of physical properties may be obtained and this is desirable because of the wide variety of possible uses for the material. For instance, copolymers having a plastic consistency are desirable when preparing adhesives and a relatively stiff elastic mass is desired when preparing rubber-like tire tread stock. The particular formula employed will be dependent upon the final intended use of the polymerized product.

It is obvious that modifications may be made or that some features may be used without others, all without departing from the spirit or scope of our invention. For instance, while in each of the above examples, the rubber-like material is compounded according to the same formula for producing a rubber-like material suitable for use in the manufacture of tire tread stock, it is obvious that the polymerization product may be compounded with other materials and in different proportions for vulcanization depending upon the use to which the vulcanized synthetic rubber-like material is to be put, or can be used without being vulcanized, if desirable. Also, emulsifying agents and polymerization catalysts other than those set forth in the foregoing examples may be used and other compounds, such as acrylonitrile and the like, may be polymerized with the conjugated diene and para-methyl-alpha-methylstyrene. As set forth more fully in our copending application Serial No. 461,784, filed October 12, 1942, vinyl esters of aliphatic or alicyclic acids containing at least twelve and not more than twenty-four carbon atoms may be copolymerized with butadiene and para-methyl-alpha-methylstyrene.

What is claimed is:

1. A rubber-like material comprising the emulsion polymerization product of about 35 parts by weight of para-methyl-alpha-methylstyrene and about 65 parts by weight of butadiene 1,3.

2. A vulcanized rubber-like material comprising the precipitated emulsion polymerization product of about 35 parts by weight of para-methyl-alpha-methylstyrene and about 65 parts by weight of butadiene 1,3 and a vulcanizing agent.

3. In a process of manufacturing a rubber-like material, the step of copolymerizing in an aqueous emulsion about 35 parts by weight of para-methyl-alpha-methylstyrene and about 65 parts by weight of butadiene 1,3.

KARL H. WEBER.
PAUL O. POWERS.

REFERENCES CITED

The following references are of record in the file of this patent:

UNITED STATES PATENTS

| Number | Name | Date |
| --- | --- | --- |
| 1,938,730 | Tschunker et al. | Dec. 12, 1933 |
| 2,198,185 | Stanley et al. | Apr. 23, 1940 |
| 2,302,464 | Palmer et al. | Nov. 17, 1942 |

FOREIGN PATENTS

| Number | Country | Date |
| --- | --- | --- |
| 342,314 | Great Britain | Jan. 30, 1931 |
| 506,160 | Great Britain | May 24, 1939 |
| 588,785 | Germany | Nov. 27, 1933 |

Certificate of Correction

Patent No. 2,450,028. September 28, 1948.

KARL H. WEBER ET AL.

It is hereby certified that errors appear in the printed specification of the above numbered patent requiring correction as follows:

Column 1, line 47, for "equeous" read *aqueous*; column 2, line 50, for "6.075 pounds" read *6,075 pounds*; column 3, line 40, before the word "break" strike out "a";

and that the said Letters Patent should be read with these corrections therein that the same may conform to the record of the case in the Patent Office.

Signed and sealed this 14th day of December, A. D. 1948.

[SEAL]

THOMAS F. MURPHY,
*Assistant Commissioner of Patents.*